(12) United States Patent
Maggi et al.

(10) Patent No.: US 10,563,766 B2
(45) Date of Patent: Feb. 18, 2020

(54) PACKING CASE FOR RECIPROCATING MACHINE AND METHOD OF ASSEMBLING THE SAME

(71) Applicant: Nuovo Pignone Srl, Florence (IT)

(72) Inventors: Carmelo Maggi, Florence (IT); Jan Pawel Wojnar, Warsaw (PL); Michele Sanesi, Florence (IT); Leonardo Tognarelli, Florence (IT)

(73) Assignee: NUOVO PIGONE SRL, Florence (IT)

( * ) Notice: Subject to any disclaimer, the term of this patent is extended or adjusted under 35 U.S.C. 154(b) by 0 days.

(21) Appl. No.: 15/533,305

(22) PCT Filed: Nov. 27, 2015

(86) PCT No.: PCT/EP2015/077914
§ 371 (c)(1),
(2) Date: Jun. 5, 2017

(87) PCT Pub. No.: WO2016/087326
PCT Pub. Date: Jun. 9, 2016

(65) Prior Publication Data
US 2018/0010691 A1 Jan. 11, 2018

(30) Foreign Application Priority Data
Dec. 5, 2014 (IT) .............................. CO2014A0037

(51) Int. Cl.
*F16J 15/28* (2006.01)
*F16J 15/18* (2006.01)
(Continued)

(52) U.S. Cl.
CPC ......... *F16J 15/182* (2013.01); *F04B 39/0284* (2013.01); *F04B 53/143* (2013.01); *F16J 15/26* (2013.01); *F04B 39/0022* (2013.01)

(58) Field of Classification Search
CPC .. F16J 15/18; F16J 15/182; F16J 15/26; F16J 15/32; F16J 15/324; F04B 53/143;
(Continued)

(56) References Cited

U.S. PATENT DOCUMENTS 1,844,903 A * 2/1932 Queen .................... F16J 15/162
277/513
1,927,507 A * 9/1933 Sommers ................. F16J 15/28
277/515

(Continued)

FOREIGN PATENT DOCUMENTS

| EP | 2 749 794 A1 | 7/2014 | |
|---|---|---|---|
| EP | 2749794 A1 * | 7/2014 | ............. F16J 15/162 |
| EP | 2749794 B1 * | 9/2015 | ............. F16J 15/162 |

OTHER PUBLICATIONS

Italian Search Report and Opinion issued in connection with corresponding IT Application No. CO2014A000037 dated Sep. 2, 2015.

(Continued)

*Primary Examiner* — Gilbert Y Lee
(74) *Attorney, Agent, or Firm* — Baker Hughes Patent Organizaton

(57) ABSTRACT

A packing case for a plunger or a piston rod of a reciprocating machine comprises packing cups, each packing cup comprising a body with a hole for the passage of the plunger or rod and a sealing ring seat for housing a sealing ring which slidably bear against the plunger or rod. Packing cups are aligned with each other in series. The packing case comprises lube oil ducts for supplying lube oil from an end of the packing case to the sealing ring seat. Each packing cup comprises sectors, each sector comprising at least lube oil duct portions. The packing cups are positionable to bring, one sector at a time in an activation position where some of the lube oil duct portions of the sector are connected with the (Continued)

lube oil duct portions of an adjacent packing cup to form lube oil ducts. The packing cups are lockable.

11 Claims, 5 Drawing Sheets

(51) Int. Cl.
*F04B 39/02* (2006.01)
*F16J 15/26* (2006.01)
*F04B 53/14* (2006.01)
*F04B 39/00* (2006.01)

(58) Field of Classification Search
CPC .................................................. F04B 53/164; F04B 39/0284; F04B 39/0292; F04B 39/12; F04B 39/002
See application file for complete search history.

(56) References Cited

U.S. PATENT DOCUMENTS

| | | | |
|---|---|---|---|
| 6,478,303 B1 * | 11/2002 | Radcliffe | F16J 15/28 166/84.1 |
| 6,932,351 B1 | 8/2005 | Mowll | |
| 8,366,114 B1 | 2/2013 | Gruner | |
| 9,027,934 B2 * | 5/2015 | Lindner-Silwester | F04B 39/0022 277/500 |
| 2011/0298183 A1 | 12/2011 | Lindner-Silwester et al. | |

OTHER PUBLICATIONS

International Search Report and Written Opinion issued in connection with corresponding PCT Application No. PCT/EP2015/077914 dated Feb. 2, 2016.

International Preliminary Report on Patentability issued in connection with corresponding PCT Application No. PCT/EP2015/077914 dated Jun. 6, 2017.

* cited by examiner

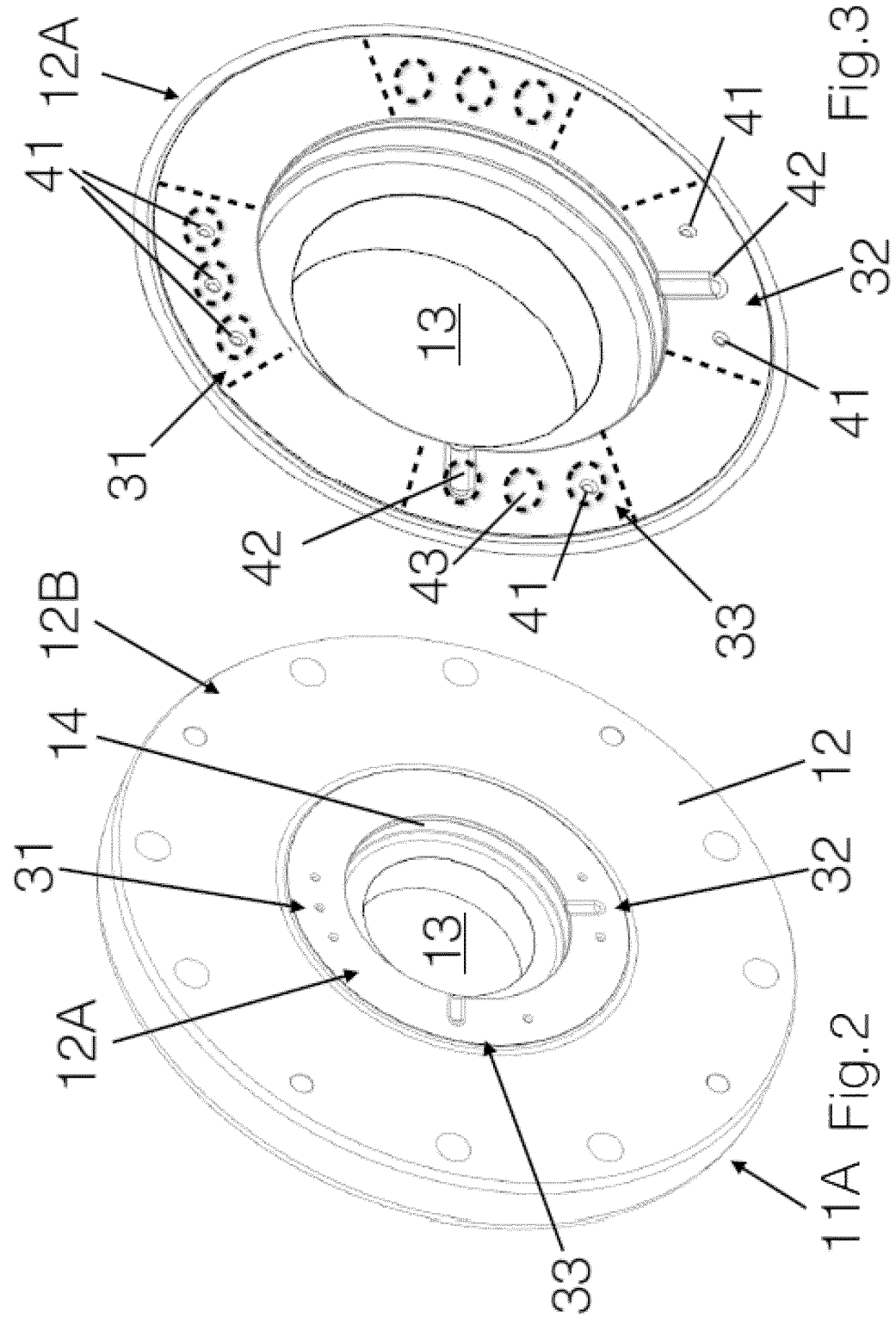

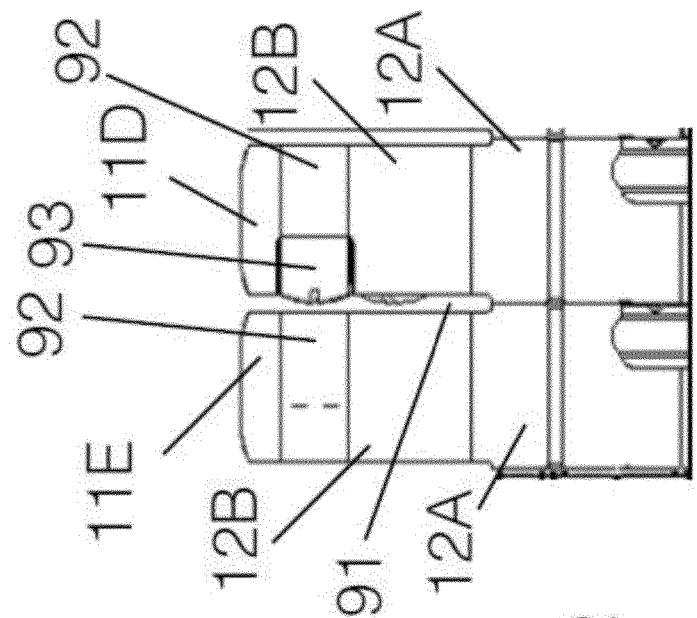
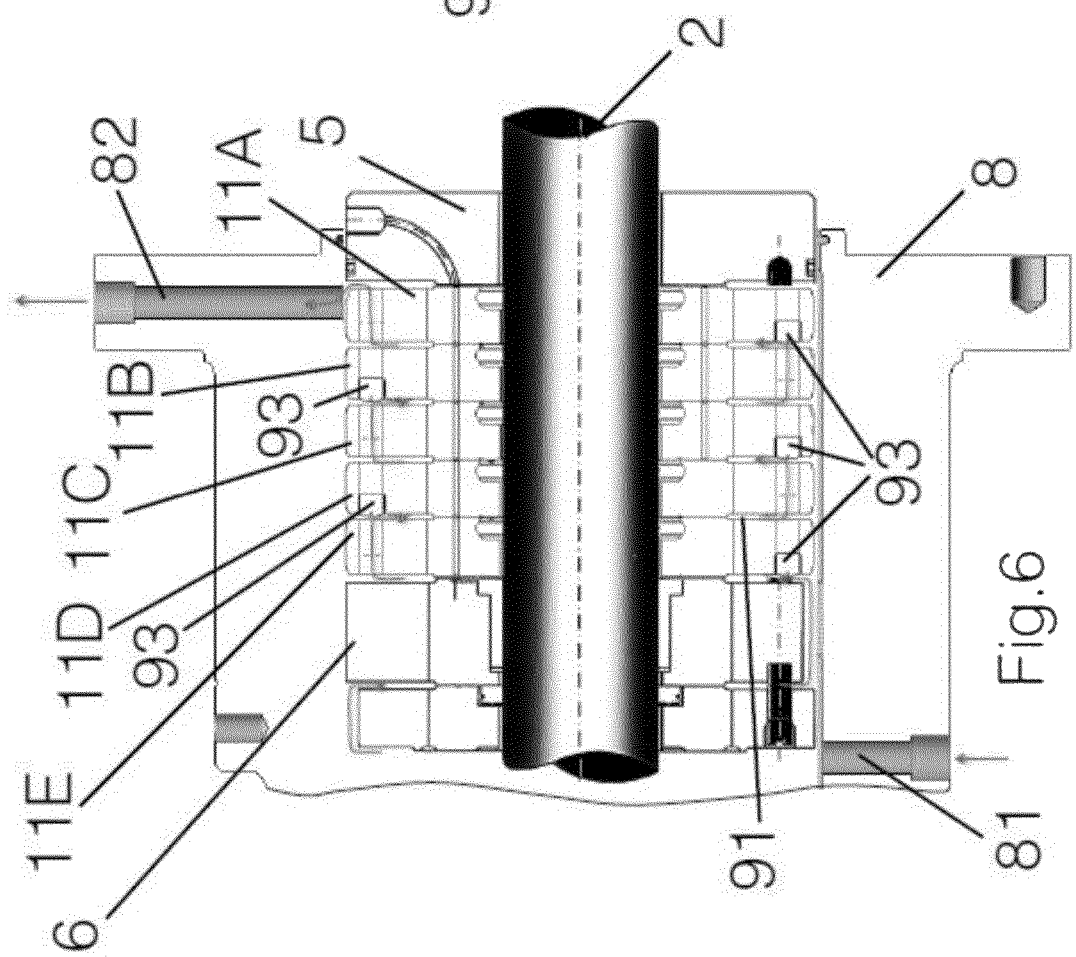

PACKING CASE FOR RECIPROCATING MACHINE AND METHOD OF ASSEMBLING THE SAME

BACKGROUND

Embodiments of the subject matter disclosed herein correspond to reciprocating machine, such as compressors and more particularly, but not exclusively, hypercompressors and packing cups and packing cases for those machines.

It is known that hypercompressors are reciprocating machines where a fluid is converted to an extremely high pressure (for example up to 3500 bar) because of a plunger compressing the fluid into a chamber; generally they can be single- or multi-staged.

It is known in the state of the art to arrange a sealing and jacket around the plunger or more generally around a piston rod of a reciprocating machine, like compressor or similar.

Such jacket usually comprises a packing case that in turn comprises a plurality of packing cups.

Packing cups usually have a disc-like shape and they are provided with a hole in the centre through which the plunger or rod passes when it reciprocates; the packing cups are assembled aligned and side by side with each other.

Each packing cup comprises plunger sealing rings intended to provide a seal on the plunger or rod; such plunger sealing rings have to be lubricated in order to avoid frictions and wear against the plunger or rod; to this end the packing case is provided with ducts intended for the passage of the lubricant; lube ducts are therefore housed in the packing cups.

For example, with reference to a packing case comprising five packing cups, it is assembled with a first packing cup adjacent to a distribution cup (usually remotely from the compressor chamber) followed by a second, third, fourth and fifth successive packing cups. Usually a ring carrier and a pressure breaker cup, adjacent to the compressor chamber are provided adjacent to the fifth packing cup.

Lubrication, for example, provides to bring the lubricant to the second and fourth plunger sealing rings (placed between the first and the second packing cups and between the third and the fourth packing cups respectively) and to further lubricate the region between the fifth packing cup and the ring carrier.

To this end lube oil ducts passing through one or more of the packing cups are provided.

In details, with reference to the known art just described, the duct intended to bring the lubricant to the second plunger sealing ring comprises an initial portion that passes through the distribution cup, an intermediate portion that parallel—with respect to the plunger axis—passes through the first packing cup and an end portion radial—with respect to the plunger axis—ending in the region to be lubricated.

Similarly, the duct intended to bring the lubricant to the fourth plunger sealing ring comprises an initial portion that passes through the distribution cup, an intermediate portion that parallel—with respect to the plunger axis—passes through the first, the second and the third packing cups and an end portion—radial with respect to the plunger axis— ending in the region to be lubricated.

Still similarly, the duct intended to bring the lubricant between the fifth packing cup and the ring carrier comprises an initial portion that passes through the distribution cup, an intermediate portion that parallel—with respect to the plunger axis—passes through the first, the second, the third, the fourth and the fifth packing cups and an end portion— radial with respect to the plunger axis—ending in the region to be lubricated.

From this situation it results that each packing cup, depending on its position in the packing case, houses (or not) one or more parts of the intermediate portion of the different ducts: the fact of placing the several packing cups side by side in the assembled condition causes the parts of the duct intermediate portions to be joined till forming the complete ducts.

The duct intermediate portions are made as through holes passing from one face to the other one of the packing cup, while the duct end portions are made as radial grooves (with respect to the plunger axis) connected to the relevant duct intermediate portions and ending at the region to be lubricated.

For instance, in the example just described, the first packing cup is provided with three holes: each one is a part of the intermediate portion of the first, second, and third ducts respectively intended to bring the lubricant to the second and fourth plunger sealing ring and in the region between the fifth packing cup and the ring carrier respectively.

The second packing cup is on the contrary provided with two holes: each one is a part of the intermediate portion of the second and third ducts respectively intended to bring the lubricant to the fourth plunger sealing ring and in the region between the fifth packing cup and the ring carrier respectively; the second packing cup is further provided with a radial groove, which is the end portion of the first duct.

The third packing cup is provided with two holes: each one is a part of the intermediate portion of the second and third ducts respectively intended to bring the lubricant to the fourth plunger sealing ring and in the region between the fifth packing cup and the ring carrier respectively.

The fourth packing cup is on the contrary provided with one hole as a part of the intermediate portion of the third duct intended to bring the lubricant in the region between the fifth packing cup and the ring carrier; the fourth packing cup is further provided with a radial groove, which is the end portion of the second duct.

Finally the fifth packing cup is provided with one hole as a part of the intermediate portion of the third duct intended to bring the lubricant in the region between the fifth packing cup and the ring carrier which, on its turn, comprises a radial groove.

From such exemplary situation it is easy to understand how each packing cup is unique, meaning that, once its position inside the packing case is established, it has to comprise certain ducts and no other ones.

Therefore, from the above, a first drawback of the known solutions is clear, which leads to produce each packing cup in a different manner depending on its position in the packing case; from this derives the need of having a plurality of single (first, second, third etc) packing cups in stock if it is necessary to replace one of them for maintenance reasons.

BRIEF DESCRIPTION

Therefore there is a general need for an improved packing case for reciprocating machines.

An important idea is to make the packing cups all equal to each other, and potentially to reduce manufacturing and warehousing costs.

Another important idea is a method of creating a plurality of service or auxiliary fluid ducts of different length and/or configuration in a machine, more particularly, a reciprocating machine, comprising the steps of: A) providing a plurality of modules incorporating one or more portions of duct, B) integrating the plurality of modules in a corresponding plurality of components, and C) positioning the components of said plurality adjacent to each other; wherein each of the components integrates a set of modules of different types; wherein at least one or only one of the modules of each component is used for creating service or auxiliary fluid ducts.

Embodiments of the subject matter disclosed herein correspond to a packing case for a reciprocating machine; such packing case is able to provide a seal along and around at least a part of a movable plunger or piston rod of the reciprocating machine; the packing case comprises a plurality of packing cups, each packing cup comprising on its turn a body with a hole for the passage of the plunger or rod and a sealing ring seat for housing a sealing ring which slidably bear against the plunger or rod to provide sealing; said packing cups are aligned with each other in series relative to the respective holes for the passage of the plunger or rod; the packing case comprises a plurality of lube oil ducts for supplying lube oil from an end of the packing case in an area of sealing ring seat.

According to the idea above, it is provided that all the packing cups are identical each other; each packing cup comprises sectors angularly offset with each other, each sector being provided at least by lube oil duct portions, the packing cups being selectively positionable with each other to bring, for each packing cup, one sector at a time in an activation position; in such activation position at least some of the lube oil duct portions of said sector is operatively connected with the lube oil duct portions of a sector in the activation position of an adjacent packing cup so as to form said lube oil ducts; once positioned, the packing cups can be locked each by each in a position corresponding to the activation position of a chosen circular sector.

In this way it is possible to have a packing case composed of all identical packing cups, which, during an assembly operation of the packing case, are placed, each by each, in different positions with respect to each other: in said positions one sector for each packing cup is activated (and—in use—supplied by lube oil) so that to form the whole lube oil ducts of the packing case itself.

It is therefore possible to overcome the above cited problems of the prior art, since it is possible to have only one kind of packing cup used for the entire packing case.

Manufacturing problems, availability and cost problems related to the known art have therefore brilliantly overcome by the above mentioned idea: only some lube oil duct portions for each sector of each packing cup will be active (that is, in fluid communication between one packing cup and another one and—in use—supplied by lubricant) and it will be possible to generate different paths of each lube oil duct by using always the same type of packing cup, suitably positioned before locking it in position, such to activate only one of the available sectors for each packing cup, depending to the position of the same packing cup in the packing case.

The remaining lube oil duct portions for each sector of each packing cup that are not in the activation position are not supplied by lubricant.

Embodiments of the subject matter disclosed herein correspond to a packing cup for a packing case of reciprocating machines, comprising a body with a hole for the passage of a plunger or rod of the reciprocating machine, said hole having a first longitudinal axis, a sealing ring seat for housing a sealing ring which slidably bear against the plunger or rod to provide sealing, wherein the packing cup comprises sectors angularly offset with each other, each sector being provided at least by lube oil duct portions, in each sector of the packing cup a plurality of available positions being grouped, every available position of such plurality being lined on the same circumference having its center on said first axis, each available position of such plurality being used for one between: an axial lube oil duct portion extending between opposed faces of said packing cup, a radial lube oil duct portion, more particularly a radial groove, extending radially to the sealing ring seat of the packing cup, a stopping wall, in which, for each packing cup, the number of sectors is at least equal or major than the number of available positions of each sector, in which different sectors of the same packing cup have said available positions used for a number of axial lube oil duct portions decreasing from a maximum number equal to the number of sectors, at least one of the remaining available positions of each sector being used for a a radial lube oil duct portion, more particularly a radial groove.

Embodiments of the subject matter disclosed herein correspond to a reciprocating machine, in particular a compressor, an hypercompressor or the like, provided by such a packing case.

BRIEF DESCRIPTION OF DRAWINGS

The accompanying drawings, which are incorporated herein and constitute a part of the specification, illustrate exemplary embodiments of the present invention and, together with the detailed description, explain these embodiments. In the drawings:

FIG. 2 shows a perspective view of one packing cup of the packing case of FIG. 1;

FIG. 3 shows an enlarged detail of FIG. 2;

FIG. 6 shows a sectional view of part of a reciprocating machine provided with the packing case of FIG. 1 and a surrounding sheath; and FIG. 7 shows an enlarged detail of FIG. 6.

DETAILED DESCRIPTION

The following description of exemplary embodiments refers to the accompanying drawings.

The following description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to the idea herein described, the method of creating a plurality of service or auxiliary fluid ducts of different length and/or configuration in a machine, more particularly a reciprocating machine, comprising the steps of: A) providing a plurality of modules incorporating one or more portions of duct, B) integrating the plurality of modules in a corresponding plurality of components, and C) positioning the components of said plurality adjacent to each other; each of the components integrates a set of modules of different types and at least one or only one of the modules of each component is used for creating service or auxiliary fluid ducts.

In general such service or auxiliary fluid ducts can be oil or lubricant or also different fluid that reach different areas of the machine by following a plurality of fluid ducts.

In an embodiment, each of the components integrates a set of modules of different types at a corresponding set of angular positions; and, at step C above, each of the components is rotated before being positioned so as to align at least one or only one of its modules with at least one or only one of the modules of adjacent components.

In an embodiment, all of the components of said plurality are identical and each of the components of said plurality integrates the same set of modules of different types.

In the following said a method will be described with reference to the attached figures; in the exemplary embodiment herein below described, the above mentioned "components" are embodied by packing cups, "modules" are embodied by sectors, and the service or auxiliary fluid is oil or lubricant.

Figure 1:
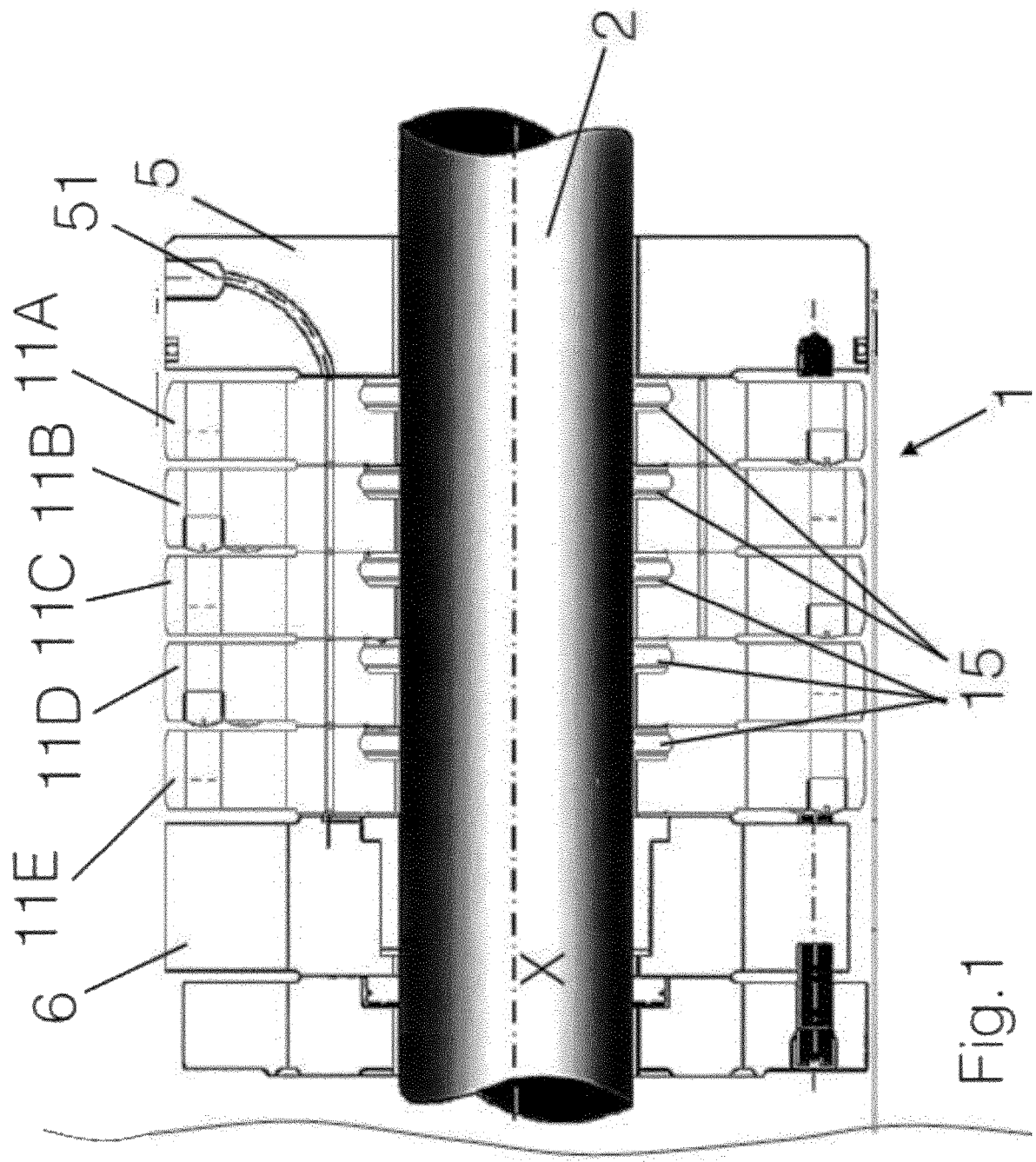
FIG. 1 shows a sectional view of part of a reciprocating machine provided with a packing case.

With reference to FIG. 1 enclosed, a sectional view of part of a reciprocating machine provided with a packing case according to a first embodiment is shown.

The packing case 1 serves for providing a seal along and around at least a part of a movable plunger 2 (or piston rod) of the reciprocating machine (not shown in its entirety).

The packing case 1 comprises at least a plurality of packing cups, in this non limiting example there are five packing cups 11A-11E, although a different number of them is provided in different embodiments (not shown) of the subject matter herein disclosed.

The packing case 1 further comprises a distribution cup 5, adjacent to a first packing cup 11A, and a ring carrier 6, adjacent to the last packing cup 11E.

The distribution cup 5 is provided by one fixed lubricant supply duct 51, on its turn coupled with a lubricant source (not shown) such a lubricant tank, a lubricant pump, a lubricant piping or similar.

With reference also to FIGS. 2 and 3, each packing cup 11A-11E comprises a body 12 with a hole 13 for the passage of the plunger or rod 2.

The shape of the body is circular, as shown, with the hole 13 having the same center of the body; more in general, other different shapes than the ones shown here could be also used.

Each packing cup 11A-11E further comprises a sealing ring seat 14 for housing a sealing ring 15 (see FIG. 1). The latter surrounds the hole 13 for the plunger 2 and, in an assembled condition, slidably bear against the plunger 2 itself to provide sealing.

Figure 4:
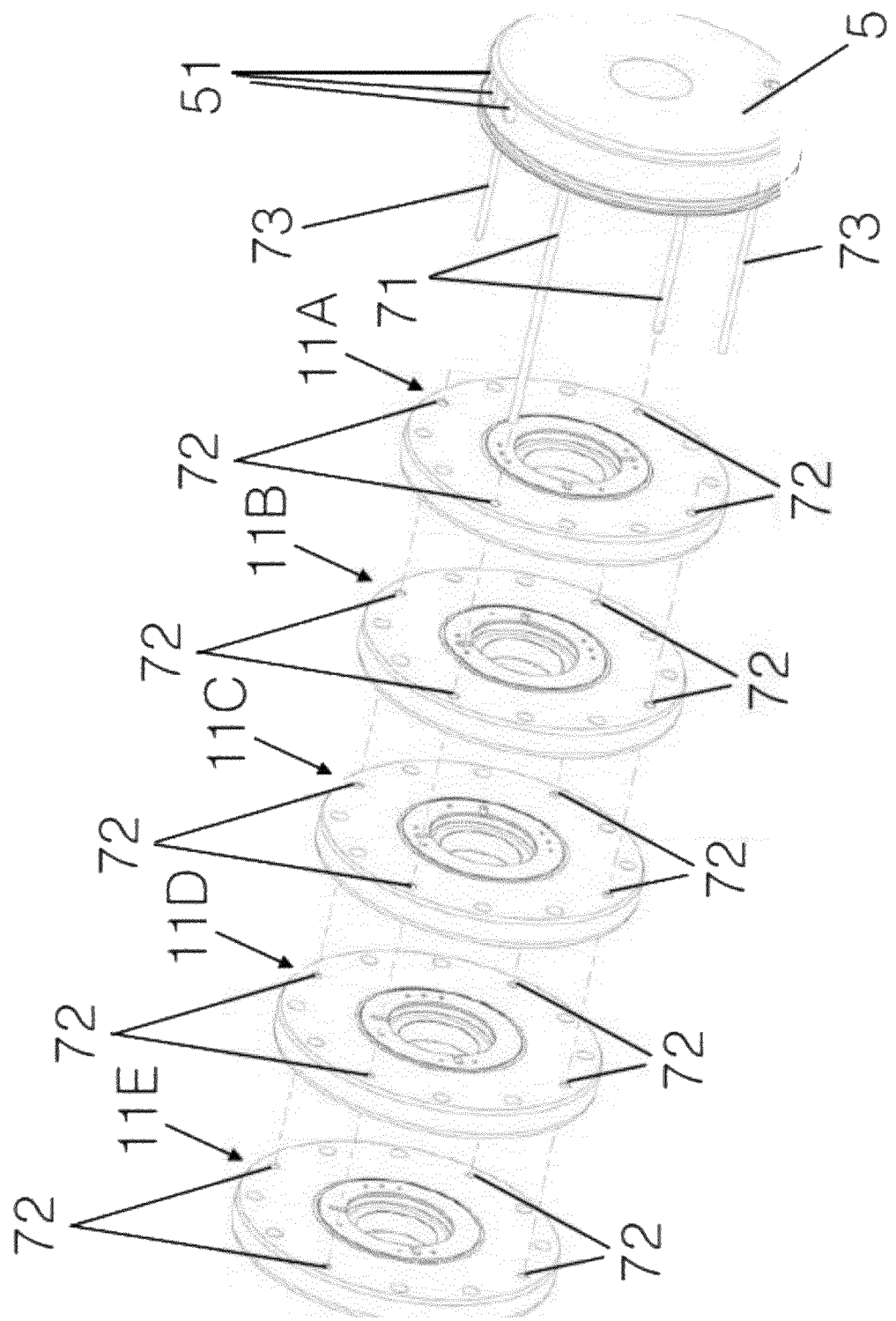
FIG. 4 shows perspective and exploded view of the packing case of FIG. 1.

As can be best seen in FIG. 1 or in the exploded view of FIG. 4, in the packing case 1 the packing cups 11A-11E are aligned with each other in series relative to the respective holes 13 for the passage of the plunger or rod 2.

The packing case 1 further comprises a plurality of lube oil ducts A, B, C for supplying lube oil (or—more generally—lubricant) from an end of the packing case in an area of the sealing ring seat 14, in order to lubricate the latter and/or the sealing ring 15.

In the non limiting example, there are three lube oil ducts A, B, C (see also FIG. 5): a first lube oil duct A for supplying lubricant into an area of the (second) sealing ring seat 14 of the second packing cup 11B, a second lube oil duct B for supplying lubricant into an area of the (fourth) sealing ring seat 14 of the fourth packing cup 11D a third lube oil duct C for supplying lubricant into an area between the fifth packing cup 11E and the ring carrier 5.

According to the idea herein described, and as can be seen in FIG. 4, all the packing cups 11A-11E of the packing case 1 are identical each other, so as obtain the above mentioned advantages.

To this extent and for allowing to create the different lube oil ducts A,B,C, each packing cup 11A-11E comprises sectors 31, 32, 33 angularly offset with each other, each sector 31, 32, 33 comprising at least lube oil duct portions 41,42.

In FIGS. 2 and 3 only the packing cup 11A is shown, the remaining being identical to this one.

Particularly, in FIG. 3, such sectors 31, 32, 33 are highlighted by means of dashed lines indicating their position on the packing cup 11A; in FIG. 2 the sectors 31, 32, 33, though not highlighted, are nevertheless present, since those "sectors" are merely areas of the packing cup 11A itself.

The packing cups 11A-11E are selectively positionable with each other to bring, for each packing cup 11A-11E, one sector 31, 32, 33 at a time in an "activation position".

Particularly, when each sector is a circular sector 31, 32, 33, the packing cups 11 are selectively positionable with each other by means of a rotation around a first axis coincident to a central longitudinal axis X of the hole 13 for the plunger or rod 2.

In the activation position at least some of the lube oil duct portions 41, 42 of said sector 31, 32, 33 are operatively connected with the lube oil duct portions 41, 42 of a sector 31, 32, 33 in the activation condition of an adjacent packing cup 11A-11E so as to form said lube oil ducts A, B, C.

During operation, the lube oil duct portions 41, 42 that are in the activation position are supplied by lubricant by means of the fixed lubricant supply duct 51 of the distribution cup 5; remaining oil duct portions of sectors in a non-activation position (every position different than the activation position) are not supplied by lubricant or oil.

The packing cups 11A-11E are then lockable each by each at one position corresponding to the activation position of a circular sector 31, 32, 33 of the packing cup, in a way that will be described later on.

More particularly, for each sector 31, 32, 33 of each packing cup 11A-11E a plurality of available positions are grouped, every available position of such plurality being lined on the same circumference having its center on said first axis X.

Looking at FIG. 3, for clarification extent, there are highlighted, for two sector, namely 31, 33, the available positions, shown as dashed circles; available positions are therefore areas of one sector that are lined on the same circumference having its center on said first axis X.

All the available positions of all the sectors are on the same circumference, while all such circumferences of different packing cups have all the center on the first axis X and the same radius.

Each available position of such plurality is used for one between: an axial lube oil duct portion 41, extending between opposed faces of the packing cup 11A-11E, a radial lube oil duct portion, extending radially to the sealing ring seat 14 of the same packing cup 11A-11E, a stopping wall 43.

The radial lube oil duct portion is a radial groove 42.

For example, looking at FIG. 3, sector 31 has all the available positions (three in this example) used for axial lube oil duct portions 41, while sector 33 has one available position used for an axial lube oil duct portion 41, one used for a radial groove 42 and one used for a stopping wall 43. The remaining sector 32 (in which the available positions are not highlighted) has two available positions used for a axial lube oil duct portions 41 and one used for a radial groove 42.

During an assembly operation of the packing case 1, the packing cups 11A-11E are placed, each by each, in different (in this example, angular) positions with respect to each other: in said positions one sector for each packing cup is activated (and—in use—supplied by lube oil), and, in major detail, at least some of the duct portions 41, 42 of said sector are supplied by oil or lubricant: in this way, activating only one of the available sectors for each packing cup (depending to the position of the same packing cup in the packing case), it is possible to realize the whole lube oil ducts A, B, C of the packing case 1 itself.

More particularly, for each packing cup 11A-11E, the number of sectors 31-33 is at least equal, or major, than the number of available positions of each sector; to this extent in FIG. 4 there is shown in dashed lines an additional, optional, spare sector, which, in this example is not in use.

It has to be noted that different sectors 31, 32, 33 of the same packing cup 11 have said available positions used for a number of axial lube oil duct portions 41 decreasing from a maximum number equal to the number of lube oil ducts A, B, C of the packing case 1.

So, for example, if the number of lube oil ducts A, B, C is three, then there will be a sector having three axial lube oil duct portions 41, another sector having two axial lube oil duct portions 41, and another sector having one axial lube oil duct portions 41.

In this case, at least one of the remaining available positions of each sector 31, 32, 33 is used for a a radial lube oil duct portion, such as a radial groove 42.

When assembling the packing case 1, the packing cups 11A-11E as described are assembled, starting from a first packing cup 11A until a last packing cup 11E, and the first packing cup 11A has in the activation position a sector, 31, having a maximum number of axial lube oil duct portion 41, while the last packing cup 11E has in the activation position a minimum number of axial lube oil duct portion 41.

Remaining intermediate packing cups 11B, 11C, 11D between the first 11A and the last 11E packing cup, have in said activation position, sectors 31, 32, 33 provided by a number of axial lube oil duct portion 41 equal or less that the ones 41 of the immediately preceding packing cup in a progression starting from the first 11A to the last 11E packing cup.

In this way it is possible to align axial lube oil duct portion 41 of adjacent packing cups 11A-11E for realizing a number of lube oil ducts A, B, C that decreases from the first 11A to the last 11E packing cup of said packing case 1.

Figure 5:
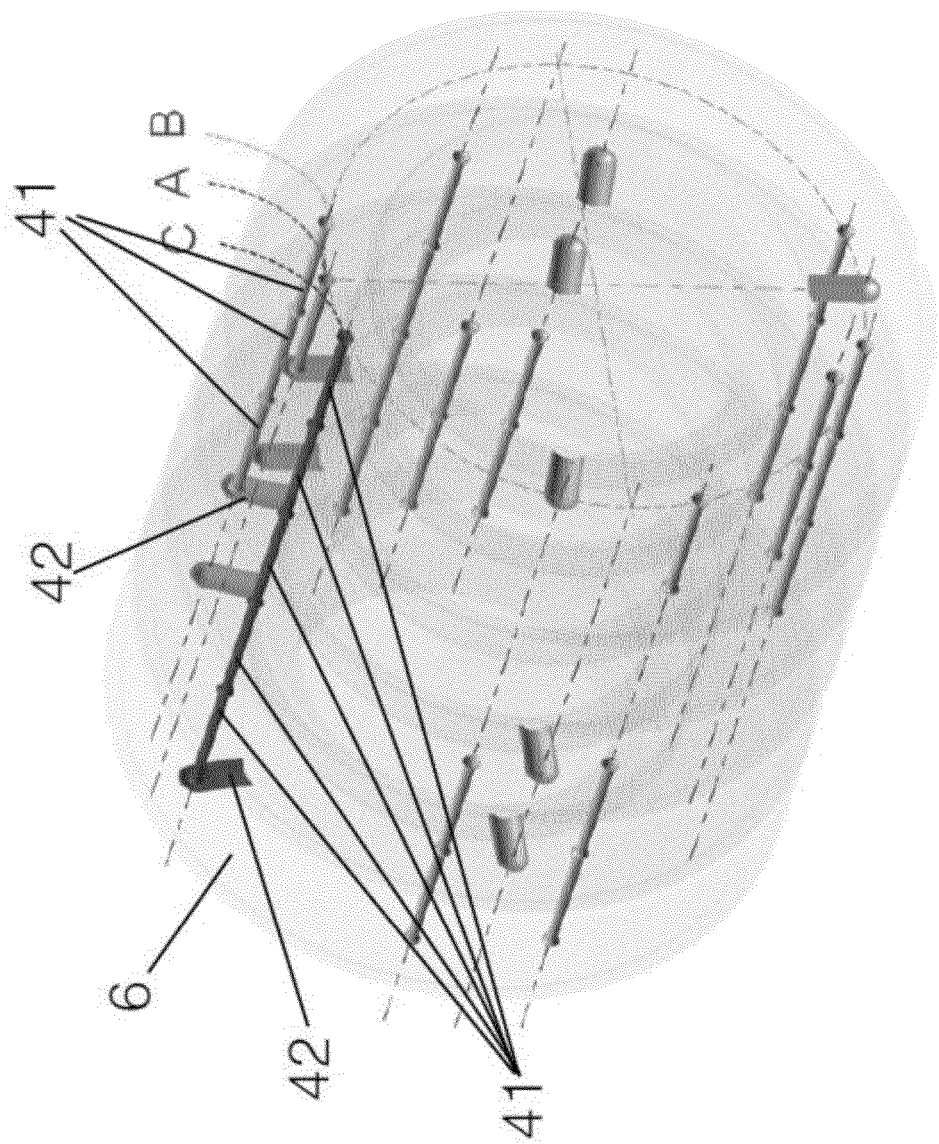
FIG. 5 shows, in transparency, lube ducts formed in the packing case of FIG. 1.

In this way, as can best be seen in FIG. 5, each lube oil duct A, B, C is formed by lube oil duct portions 41,42 of different packing cups sectors in the activation position: particularly each oil duct A, B, C comprises one or more axial lube oil duct portions 41 and one radial groove 42.

It can be noted in the non limiting example, that lube oil duct A is formed by one axial lube oil duct portions 41 (of packing cup 11A) and one radial groove 42 (of packing cup 11B); lube oil duct B is formed by three axial lube oil duct portions 41 (of packing cup 11A, 11B, 11C) and one radial groove 42 (of packing cup 11D); lube oil duct C is formed by five axial lube oil duct portions 41 (of packing cup 11A-11E) and one radial groove 42 (provided on the ring carrier 6).

Looking at the figures, in the non limiting example of the present embodiment, the whole number of lube oil ducts decreases from three to one starting from the first packing cup 11A to the last 11E.

In operation, the lube oil duct portions 41,42 in the activation position of the first packing cup 11A are aligned with the fixed lubricant supply duct 51 of the distribution cup 5, so that they can be supplied by the latter; the fixed lubricant supply duct 51 can be either in form of one single duct, or in form of a multiple channel duct.

As a matter of fact, in this preferred embodiment, the packing comprises five packing cup and three lube oil ducts A,B,C, and, in turn, each packing cup 11 comprises a first 31, a second 32 and a third 33 angularly offset circular sectors.

In this embodiment, the first circular sector 31 comprises three axial portions of lube oil ducts 41, the second circular sector 32 comprises two lube oil duct portions 41 and a radial lube oil duct portion, more particularly a radial groove 42, and the third circular sector 33 comprises one lube oil duct portion 41, one radial lube oil duct portion, more particularly a radial groove 42 and one stopping wall 43.

In an embodiment, when no spare sectors are provided and in the case of three sectors as already described, the third 33 circular sector is arranged between the second 32 and the first circular sector 31, rotated by 90° with respect to both of them.

It has to be noted that, in the preferred solution, the axial portion of the lube oil duct 41 comprises a through hole passing between two opposite faces of the body 12 of the packing cup 11A-11E arranged parallel to the first axis of the hole 13 for the plunger or rod 2 and the radial lube oil duct portion 42 comprises a groove made on a face of the body 12 of the packing cup 11A-11E and arranged radially with respect to the first axis of the hole 13 for the plunger or rod.

In an embodiment, the body 12 of each packing cup 11A-11E comprises a packing cup internal part 12A and a packing cup external part 12B surrounding the packing cup internal part.

Said two part 12A and 12B can be separated and coupled together to the extent of forming the body 12.

In this embodiment, sectors 31, 32, 33 are provided at said packing cup internal part 12A, as shown in the figures.

In order to lock in position the packing cups 11A-11E, blocking elements are provided; said blocking elements are suitable for coupling each packing cup 11A-11E with at least one between the distribution cup 5 or the ring carrier 6.

More particularly, looking at FIG. 4, as in the example shown, such blocking elements are suitable for coupling each packing cup 11A-11E with the distribution cup 5.

More particularly, the blocking elements comprises at least one, in an embodiment two, tie rod 71 and respective tie rod seats 72 of each packing cup 11A-11E, in which the tie rod 71 is housed.

Still more particularly, the blocking elements comprises also at least one, in an embodiment two, locating pin 73, which helps in the assembly operation.

Each packing cup 11A-11E comprises at least one, more particularly more than one, still more particularly four, tie rod seats 72 so to allow for locking the packing cups 11A-11E in a preferred angle position.

In this non limiting example each packing cup 11A-11E can be locked in position at interval of 45° of rotation, so as to have one chosen sector at a time in the activation position.

The packing case 1, in operation, will be cooled.

Reference is made now to FIGS. 6 and 7.

In an embodiment, in the assembled condition, at least between the packing cup external parts 12B of a pair of adjacent packing cups 11A-11E a passageway 91 is provided for a fluid coolant, that, in this way, became in contact with a large surface area of the packing cup external parts 12B, for a better cooling effect.

This can be obtained, for example, by having a different thickness between the body external part 12B and the internal part 12A, as shown in the detail of FIG. 7.

In an embodiment, body internal parts 12A of each packing cup 11A-11E are in contact each other when the packing case 1 is assembled; the thinner external parts 12B of each packing cup 11A-11E in this condition rests at a certain distance, so creating the passageway 91, in which fluid coolant can pass.

The packing case 1 further comprises an external sheath 8, that in the example of FIG. 6, houses the packing cups 11A-11E as well as the ring carrier 6 and part of the distribution cup 5, which closes one end of the external sheath 8.

The external sheath 8 is provided at least by a coolant inlet 81, in operation connected to a coolant source, and by a coolant outlet, in operation connected to a coolant discharge.

For allowing fluid coolant passing into contact with the major area of the packing cups, so as to maximize the cooling effect, a labyrinth like flow path of the coolant is provided (shown by arrows of FIG. 6).

To this extent each packing cup 11A-11E is provided by coolant holes 92, shown also in FIG. 2; coolant holes 92 are through holes passing between two opposite faces of the body external part 12B of each packing cup 11A-11E, still more particularly arranged parallel to the first axis of the hole 13 for the plunger or rod 2.

When the packing cup is assembled, coolant holes 92 are in fluid communication with the passageway 91 formed between two adjacent packing cups 11A-11E.

In order to realize the labyrinth like flow path, plugs 93 are provided, that closes only some coolant holes 92 of a packing cup 11A-11E: for example closing by plugs 93 alternatively positioned holes 92 of two adjacent packing cups, the coolant flows in the passageway 91 in contact with substantially the entire surface of the two adjacent packing cups, for an optimal cooling.

Using plugs 93 allows to close only chosen holes 92 in function of the angular position of each packing cup and its position in the packing case 1.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A packing case for a reciprocating machine to provide a seal along and around at least a part of a movable plunger or piston rod of the reciprocating machine, comprising:
    a plurality of packing cups wherein each packing cup comprises:
        a body with a hole for the passage of the plunger or rod
        a sealing ring seat for housing a sealing ring which slidably bear against the plunger or rod to provide sealing,
    said packing cups being aligned with each other in series relative to the respective holes for the passage of the plunger or rod;
    said packing case comprising a plurality of lube oil ducts for supplying lube oil from an end of the packing case in an area of sealing ring seat;
    each packing cup comprises sectors angularly offset relative to each other along a common circumference having its center about an axis coincident to a central longitudinal axis of the hole for the passage of the plunger or rod, each sector includes a plurality of available positions along the common circumference, wherein each available position is used for an axial lube oil duct portion extending between opposed faces of said packing cup, a radial lube oil duct portion extending radially to the sealing ring seat of the packing cup, or a stopping wall,
    the sectors comprising:
        a first circular sector comprises three axial portions of lube oil ducts;
        a second circular sector comprises two lube oil duct portions and a radial lube oil duct portion; and
        a third circular sector comprises one lube oil duct portion, one radial lube oil duct portion and one stopping wall,
    wherein the packing cups are selectively positionable with each other to bring, for each packing cup, one sector at a time in an activation position, in such activation position at least some of the lube oil duct portions of said sector being operatively connected with the lube oil duct portions of a sector in the activation condition of an adjacent packing cup so as to form said lube oil ducts; and the packing cups are lockable each by each at one position corresponding to the activation position of a circular sector.

2. The packing case of claim 1, further comprising a distribution cup provided at least by one fixed lubricant supply duct, said activation position corresponding to a position wherein at least some of the lube oil duct portions of a sector in an activation position are in fluid communication with said fixed lubricant supply duct.

3. The packing case of claim 1, wherein the axial portion of the lube oil duct comprises a through hole passing between two opposite faces of the body of the packing cup arranged parallel to the first axis of the hole for the plunger or rod and the radial lube oil duct portion comprises a groove made on a face of the body of the packing cup and arranged radially with respect to the first axis of the hole for the plunger or rod.

4. The packing case of claim 1, comprising blocking elements for fixing in position each packing cup.

5. The packing case of claim 1, wherein the body of each packing cup comprises a packing cup internal part and a packing cup external part surrounding the packing cup internal part, said sectors being provided at said packing cup internal part.

6. The packing case of claim 5, wherein in the assembled condition, between the packing cup external parts of a pair of adjacent packing cups a hollow passageway is made for a fluid coolant.

7. The packing case of claim 5, further comprises an external sheath that houses at least the packing cups, said external sheath being provided at least by a coolant inlet and a coolant outlet, coolant holes being provided in each packing cup as through holes passing between two opposite faces of the body external part of each packing cup, at least part of said coolant holes of each packing cup being in fluid communication with said passageway.

8. The packing case of claim 7, wherein, in an operating condition at least some of said coolant holes of each packing cup are closed by plugs, so as to provide a labyrinth like flow path of a coolant fluid in the packing case between said coolant inlet and said coolant outlet.

9. The packing machine of claim 1, wherein the packing machine is associated with a reciprocating machine.

10. A packing cup for a packing case of reciprocating machines, comprising:
   a body with a hole for the passage of a plunger or rod of the reciprocating machine, said hole having a first longitudinal axis;
   a sealing ring seat for housing a sealing ring which slidably bear against the plunger or rod to provide sealing; and
   sectors angularly offset relative to each other along a common circumference having its center about said first axis, each sector includes a plurality of available positions along the common circumference, wherein each available position is used for an axial lube oil duct portion extending between opposed faces of said packing cup, a radial lube oil duct portion extending radially to the sealing ring seat of the packing cup, or a stopping wall,
   the sectors comprising:
      a first circular sector comprises three axial portions of lube oil ducts;
      a second circular sector comprises two lube oil duct portions and a radial lube oil duct portion; and
      a third circular sector comprises one lube oil duct portion, one radial lube oil duct portion and one stopping wall.

11. The packing cup of claim 10, comprising a packing cup internal part and a packing cup external part surrounding the packing cup internal part, said sectors being provided at said packing cup internal part.

* * * * *